(12) United States Patent
Chou et al.

(10) Patent No.: US 7,925,717 B2
(45) Date of Patent: Apr. 12, 2011

(54) SECURE INTERACTION BETWEEN A MOBILE CLIENT DEVICE AND AN ENTERPRISE APPLICATION IN A COMMUNICATION SYSTEM

(75) Inventors: Wu Chou, Basking Ridge, NJ (US); Juan Jenny Li, South Orange, NJ (US); Xueshan Shan, Orefield, PA (US)

(73) Assignee: Avaya Inc., Basking Ridge, NJ (US)

( * ) Notice: Subject to any disclaimer, the term of this patent is extended or adjusted under 35 U.S.C. 154(b) by 2077 days.

(21) Appl. No.: 10/668,577

(22) Filed: Sep. 23, 2003

(65) Prior Publication Data
US 2004/0122907 A1 Jun. 24, 2004

Related U.S. Application Data

(60) Provisional application No. 60/435,463, filed on Dec. 20, 2002.

(51) Int. Cl.
*G06F 15/16* (2006.01)
(52) U.S. Cl. ........ 709/219; 709/203; 709/217; 709/231; 709/232
(58) Field of Classification Search .................. 709/203, 709/217, 219, 230–232
See application file for complete search history.

(56) References Cited

U.S. PATENT DOCUMENTS

| | | | |
|---|---|---|---|
| 6,336,137 B1* | 1/2002 | Lee et al. | 709/219 |
| 2002/0120719 A1* | 8/2002 | Lee et al. | 709/219 |
| 2003/0065749 A1* | 4/2003 | Gailey et al. | 709/219 |
| 2003/0072451 A1* | 4/2003 | Pimentel et al. | 380/270 |
| 2003/0095540 A1* | 5/2003 | Mulligan et al. | 370/352 |
| 2004/0068649 A1* | 4/2004 | Haller et al. | 713/153 |

OTHER PUBLICATIONS

J.J. Li et al., "An Adaptable Architecture for Secure Delivery of Converged Services," The 6th International Symposium on Autonomous Decentralized Systems, pp. 1-5, Apr. 2003.
F. Liu et al., "A Distributed Multimodal Dialogue System Based on Dialogue System and Web Convergence," Proc. ICSLP'02, 4 pages, Oct. 2002.
X. Shan et al., "A Case Study of IP Network Monitoring Using Wireless Mobile Devices," Proc. IC3N'01, 4 pages, Oct. 2001.
G. Niklfeld et al., "Architecture for Adaptive Multimodal Dialog Systems Based on VoiceXML," Proceedings of Eurospeech, 4 pages, 2001.
K. Wang, "Implementation of a Multimodal Dialogue System Using Extended Markup Languages," Proc. of the Int. Conf. on Spoken Language Processing, 4 pages, Oct. 2000.

(Continued)

*Primary Examiner* — Phuoc Nguyen
(74) *Attorney, Agent, or Firm* — Joseph B. Ryan; Jason Paul DeMont; Wayne S. Breyer

(57) ABSTRACT

Techniques are disclosed for controlling interaction between an enterprise application and a mobile client device in a communication system. Push content is generated in a wireless secure server or other type of server, responsive to information received in the wireless secure server from the enterprise application. The push content is deliverable from the wireless secure server to the mobile client device over a wireless network. The wireless secure server receives from the mobile client device, responsive to the push content, a request for additional information identifiable at least in part by the push content. The additional information is deliverable from the server to the mobile client device over the wireless network.

20 Claims, 4 Drawing Sheets

OTHER PUBLICATIONS

J. Hjelm et al., Index of Submissions, W3C Workshop on Delivery Context, http://www.w3.org/2002/02/DIWS/submission/, 8 pages, Mar. 2002. WAP Architecture, Version 12, Wireless Application Protocol, Architecture Specification, WAP-210-WAPArch-20010712, http://www1.wapforum.org/tech/documents, Jul. 2001.

WAP Push Architectural Overview, Version 3, Wireless Application Protocol, WAP-250-PushArchOverview-20010703-a, http://www1.wapforum.org/tech/documents, Jul. 2001.

WAP Push Access Protocol, Version 16, Wireless Application Protocol, Push Access Protocol Specification, http://www.wapforum.org/technical/PROP-PAP-19990816.pdf, Aug. 1999.

WAP Push OTA Protocol, Version 25, Wireless Application Protocol, WAP-235-PushOTA-20010425-a, http://www1.wapforum.org/tech/documents/WAP-235-PushOTA-20010425-a.pdf, Apr. 2001.

Mobilis General Description, www.activevoice.nl/press/mobilis, pp. 1-26, Mar. 2002.

\* cited by examiner

SECURE INTERACTION BETWEEN A MOBILE CLIENT DEVICE AND AN ENTERPRISE APPLICATION IN A COMMUNICATION SYSTEM

RELATED APPLICATION(S)

The present application claims the priority of U.S. Provisional Patent Application Ser. No. 60/435,463, filed Dec. 20, 2002 and entitled "System and Architecture of Multimodal and Multimedia Access for Secure Service Delivery, Service Notification and Monitoring Over Converged Networks for Mobile Users," the disclosure of which is hereby incorporated by reference herein.

FIELD OF THE INVENTION

The invention relates generally to the field of communication systems, and more particularly to techniques for implementing secure communication services within such systems, including services such as multimodal and multimedia customer relation management (CRM) and other enterprise communication services.

BACKGROUND OF THE INVENTION

The increasingly widespread use of wireless devices such as mobile telephones and personal digital assistants (PDAs) and the ubiquity of the Internet have fundamentally changed the landscape of communication services. This has led to various new challenges to provide functions such as secure service delivery, service notification and monitoring for enterprise communication services, particularly for services involving multimodal and multimedia communication.

One of the key problems in this area is how to deliver enterprise communication services to mobile users over a converged network with enhanced security and convenience. The term "converged network" in this context refers generally to a network capable of providing a common platform for a variety of distinct types of network-based communication, such as voice, data, messaging, etc. Prior approaches based on passwords and remote login have become inadequate, inconvenient and insecure, especially for mobile users.

By way of example, with regard to security, certain prior approaches may permit an authenticated user direct access to information content associated with the provision of enterprise communication services. If the authenticated user is a remote user located outside an enterprise firewall, a direct pipe is typically established through the firewall to connect the remote user to the enterprise communication services before any service can be established. These approaches therefore may provide an inadequate level of security. This lack of security is especially apparent in advanced enterprise communication services applications involving multimodal interaction and multimedia content.

In addition, mobile devices typically have very limited resources, whereas there is an increasingly strong demand for delivering active rich multimedia content through the wireless environment to the mobile user in order to enable enhanced CRM and other enterprise communication services.

A need therefore exists for improved techniques for secure service delivery, service monitoring and/or notification over converged networks for mobile users.

SUMMARY OF THE INVENTION

The present invention addresses the above-noted need by providing in an illustrative embodiment a wireless secure server arranged between a mobile client device and an enterprise application in a communication system.

In accordance with one aspect of the invention, push content is generated in a wireless secure server or other type of server, responsive to information received in the wireless secure server from the enterprise application. The push content is deliverable from the wireless secure server to the mobile client device over a wireless network. The wireless secure server receives from the mobile client device, responsive to the push content, a request for additional information identifiable at least in part by the push content. The additional information is deliverable from the server to the mobile client device over the wireless network.

The enterprise application is preferably separated from the wireless secure server via an enterprise firewall, with the enterprise application being inside the enterprise firewall and the wireless secure server being outside the enterprise firewall.

The enterprise application and the wireless secure server may be implemented on separate processing platforms, or as elements of a common processing platform such as an enterprise communication server.

The enterprise application may comprise a dialogue server configurable for use in conducting a multimodal dialogue between the enterprise application and the mobile client device.

The mobile client device may register with the enterprise application through interaction with the wireless secure server. For example, the wireless secure server may comprise a password-protected register connector through which registration information associated with the mobile client device is supplied from the wireless secure server to the enterprise application. The wireless secure server may be operative to obtain user and device profile information from the mobile client device, and to store the profile information temporarily until the profile information is extracted from the wireless secure server by the enterprise application.

The push content may be generated by the wireless secure server responsive to an event trigger generated by the enterprise application subsequent to receipt in the enterprise application of an interaction request from the mobile client device and authentication of a corresponding user by the enterprise application.

In the above-noted illustrative embodiment, the wireless secure server communicates with the mobile client device utilizing wireless application protocol (WAP). The push content is deliverable from the wireless secure server to the mobile client device via a series connection of a push initiator and a push proxy gateway. The request for additional information is deliverable from the mobile client device to the wireless secure server via a WAP gateway, and the additional information is deliverable from the wireless secure server to the mobile client device via a WAP gateway.

Advantageously, the request for additional information may be initiatable in the mobile client device utilizing a single-key operation. Such a request for additional information may initiate a WAP pull operation that pulls the information from a content generator associated with the wireless secure server and displays it on the mobile client device.

In accordance with another aspect of the invention, the push content may comprise at least one embedded uniform resource identifier (URI), with the additional information being identifiable by the embedded URI. As a more specific example, the push content may be generated in the form of a service indication (SI) including at least one notification message and at least one corresponding URI specifying a location of information associated with a corresponding service.

DETAILED DESCRIPTION OF THE INVENTION

The invention will be described below in conjunction with a number of exemplary communication systems. It should be understood, however, that the invention is not limited to use with any particular type of communication system or any particular configuration of clients, servers, gateways or other processing elements of the system. Those skilled in the art will recognize that the disclosed techniques may be used in any communication system application in which it is desirable to provide improved secure communication services within such systems, including services such as multimodal and multimedia customer relation management (CRM) and other enterprise communication services. The invention can be used with voice, video, multimedia or any other type of network traffic in a communication system.

Figure 1A:
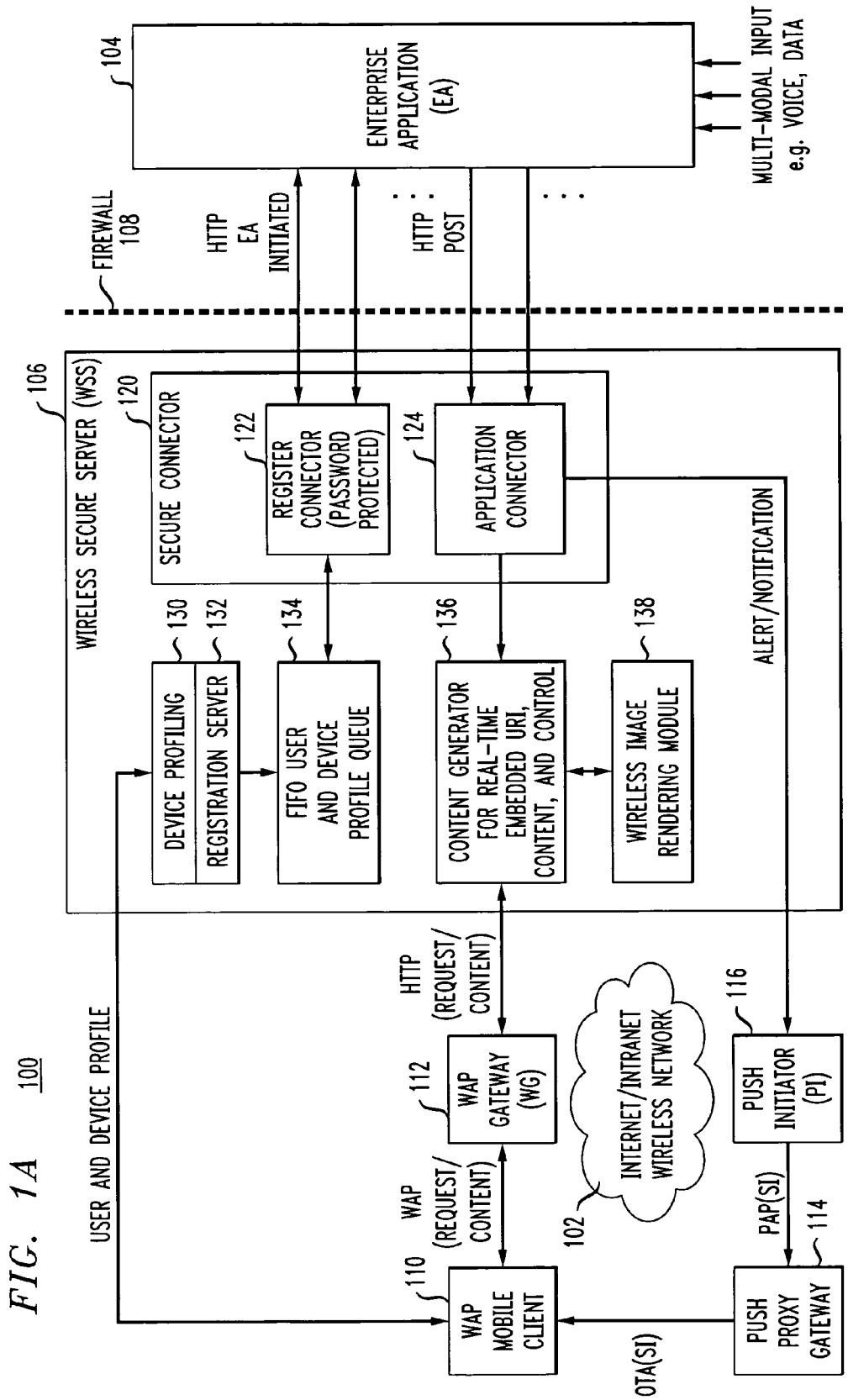
FIG. 1A shows an exemplary communication system in which the invention is implemented.

FIG. 1A shows an example communication system 100 in which the present invention is implemented. The system 100 includes a network 102, an enterprise application 104, and a wireless secure server (WSS) 106. The enterprise application 104, which is assumed to run on a computer, server or other processing element associated with a given enterprise, is separated from the WSS 106 via an enterprise firewall 108, and receives multimodal input such as voice, data, etc. from sources not shown in the figure. The system 100 further includes a wireless application protocol (WAP) mobile client device 110, which communicates with the WSS 106 over network 102. More specifically, the mobile client device 110 communicates with the WSS 106 via WAP gateway (WG) 112, and via a push proxy gateway (PPG) 114 and a push initiator (PI) 116, as shown.

The details of WAP are well known to those skilled in the art, and are described in the WAP specification documents, which are hereby incorporated by reference herein. These documents include the following:

WAP Architecture: http://www1.wapforum.org/tech/documents/WAP-210-WAPArch-20010712-a.pdf;

WAP Push Architecture: http://www1.wapforum.org/tech/documents/WAP-250-PushArchOverview-20010703-a.pdf;

PAP: http://www.wapforum.org/what/technical/PROP-PAP-19990816.pdf, and

OTA: http://www1.wapforum.org/tech/documents/WAP-235-PushOTA-20010425-a.pdf.

Although WAP is utilized in the illustrative embodiments, it should be understood that use of WAP is not a requirement of the invention.

The mobile client device 110 is also referred to herein as a mobile client, or simply as a client.

A more particular example of the enterprise application 104 is a dialogue server (DS), although numerous other enterprise applications may be used in implementing the invention.

A given DS may be implemented, again by way of example, utilizing a distributed dialogue system architecture based on Hybrid-VoiceXML, which has VoiceXML as its voice modality, or other known type of dialogue system.

The enterprise application 104 may comprise one or more software programs running on or otherwise associated with a communication system switch, such as a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc.

The WSS 106 further includes a secure connector 120 which illustratively includes a password-protected register connector 122 and an application connector 124. Security can be provided in these elements using conventional encryption or other cryptographic operations of a type known in the art. The application connector 124 communicates alert and/or notification information to the mobile client 110 via PI 116 and PPG 114 as shown.

Also included in the WSS 106 is a device profiling element 130, a registration server 132, a first-in first-out (FIFO) user and device profile queue 134, and a content generator 136 including functionality associated with real-time embedded uniform resource identifier (URI) processing, content and control. The content generator 136 interacts with WAP gateway 112, with application connector 124, and with a wireless image rendering module 138, as indicated in the figure.

As will be described in greater detail below, the WSS provides a service delivery channel that is efficiently integrated with the network 102.

In the illustrative embodiment, the WSS 106 preferably interacts with the enterprise application 104 through hypertext transfer protocol (HTTP) connections, and utilizes WAP to deliver multimedia service content to mobile client devices. More specifically, with regard to the HTTP connections, the enterprise application initiates HTTP-based communications with the register connector 122, and sends HTTP POST communications to the application connector 124.

It should be noted that the enterprise application 104 and WSS 106 may be elements of a single common processing platform, such as an enterprise communication server. For example, such a server may be utilized as a wireless multimedia technology integration platform (WMTIP) to support various applications in enterprise CRM and other services for mobile users. Examples of other services include direction information services for mobile users. A mobile user can call from a registered mobile client device and ask for a direction service to reach a certain location. The WSS engages with the mobile user and delivers the multimedia service content in the form of text, figures, maps, links, etc.

The WSS 106 is an example of what is more generally referred to herein as a "server." The term "server" as used herein in the context of the WSS is intended to include any arrangement of one or more computers or other processing devices configurable to provide interaction between a mobile client device and an enterprise application using a combination of push and pull delivery mechanisms in accordance with the invention.

User and device profile information may be shared between the mobile client 110 and a device profiling element 130 of the WSS 106, via a connection established over the network 102 or other suitable communication channel.

The mobile client 110 in FIG. 1A may be a mobile cellular telephone, a personal digital assistant (PDA), a mobile computer, or other type of processor-based client device suitably configured for interaction with the WSS 106 in providing various secure communication functions of the system 100. Conventional aspects of such client devices are well known in the art and therefore not described in further detail herein. Also, although only a single mobile client is shown in the figure, the system 100 will typically include many such clients.

Additional system elements, of a type known in the art but not explicitly shown in FIG. 1A, may be coupled between the mobile client 110 and the WSS 106, between the WSS 106 and the EA 104, or otherwise arranged within the system 100, in accordance with conventional practice.

Network 102 may represent, e.g., a global communication network such as the Internet, an intranet, a wide area network, a metropolitan area network, a local area network, a wireless cellular network, or a satellite network, as well as portions or combinations of these or other wired or wireless communication networks.

Figure 1B:
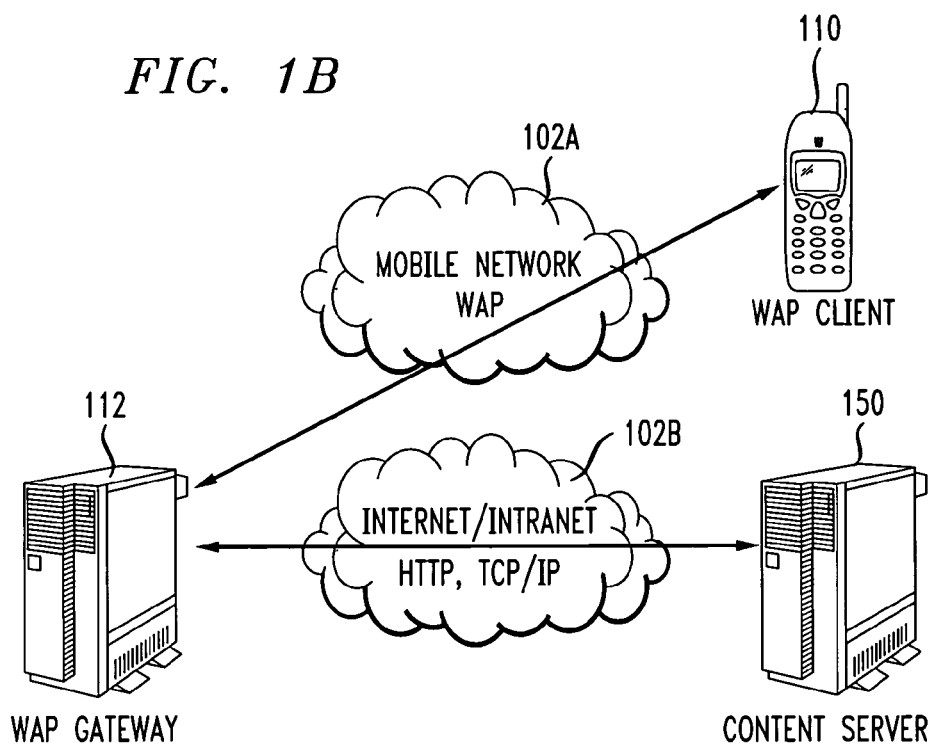
FIGS. 1B and 1C show more detailed views of example communications between processing elements of the FIG. 1A system.
Figure 1C:
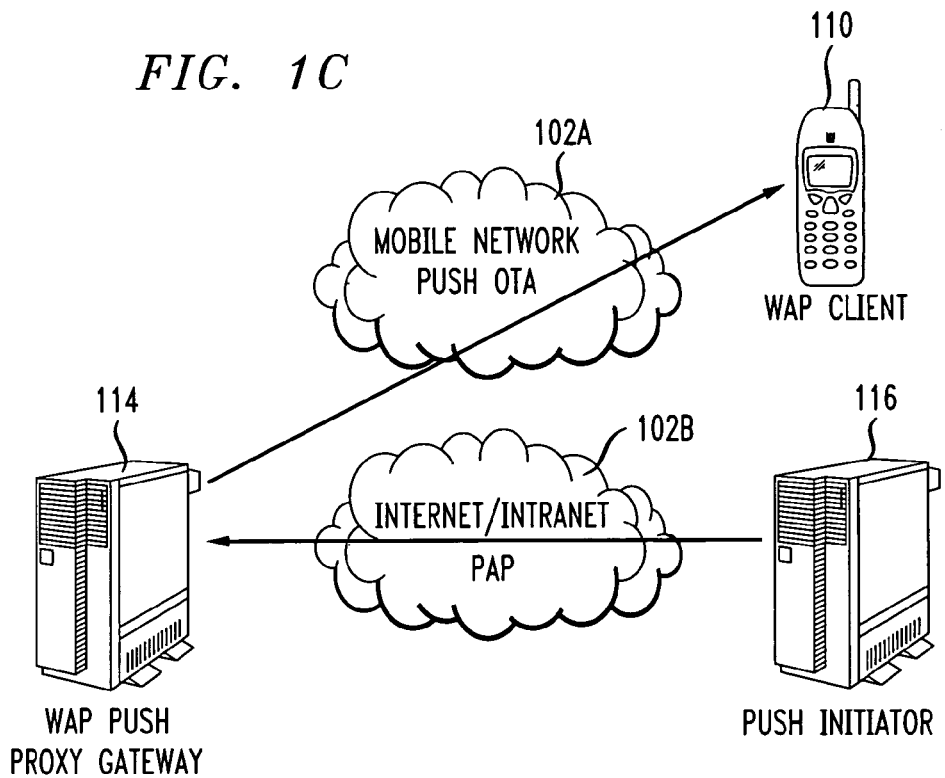

The network 102 in the illustrative embodiment may thus be viewed as a converged network which includes a mobile wireless network portion and an Internet and/or intranet network portion, as will be illustrated in FIGS. 1B and 1C.

It should be emphasized that the simplified configuration of the system 100 as shown in FIG. 1A is for purposes of illustration only, and should not be construed as limiting the invention to any particular arrangement of elements. For example, the system 100 may include additional clients, servers, gateways, routers, switches or other types of processing elements.

In accordance with the invention, the system 100 is configured to provide secure service delivery, service monitoring and/or notification over converged networks for mobile users such as a user associated with mobile client 110. This facilitates the implementation of multimodal and multimedia CRM and other enterprise communication services.

The system 100 advantageously separates authentication and service content generation functions from content access functions. More specifically, the authentication and service content generation functions are "inside" the enterprise firewall 108.

A given mobile user can access the enterprise application 104 through mobile client 110. The enterprise application engages in multimodal dialogue interaction with the user for the purpose of user authentication and the purpose of multimedia service content generation for the desired communication services.

The WSS 106 in the illustrative embodiment provides secure connections to a dialogue system associated with enterprise application 104. Multimedia service content is preferably submitted by the enterprise application 104 to the WSS 106 using HTTP. As indicated previously, the WSS is connected to the network 102 and accessible by mobile client 110 outside the firewall 108.

FIGS. 1B and 1C show more detailed views of example WAP-based communications between processing elements of the FIG. 1A system.

As indicated above, the illustrative embodiment includes a number of WAP-enabled processing elements. WAP generally provides an open, global specification for developing applications that operate over different wireless communication networks. It addresses mobile network characteristics and operator needs by adapting existing network technology to the special requirements of hand-held wireless data devices and by introducing new technologies where appropriate. Again, although the illustrative embodiment makes use of WAP and is described in that context, WAP is not a requirement of the invention, and the invention can be implemented using other standard or non-standard protocols.

One important aspect of WAP is the specification of a push architecture that allows content to be sent or "pushed" by server-based applications to WAP-compliant mobile client devices. Push functionality is particularly relevant to real-time applications that send notifications to their users, such as messaging, stock quotes and traffic update alerts. Without push functionality, these types of applications would require the devices to poll an application server for new information or status. In a wireless environment, such polling activities would constitute inefficient and wasteful use of wireless network resources. Moreover, entering URIs on mobile devices is time consuming, difficult and clumsy.

With reference to FIG. 1B, communication in accordance with a simple WAP application architecture is illustrated. In this example, WAP gateway 112 communicates with a content server 150 and with the WAP mobile client device 110 via respective portions 102A and 102B of the network 102. As mentioned previously, the network 102 in the illustrative embodiment may be viewed as a converged network which combines the capabilities of a mobile wireless network 102A and an Internet and/or intranet network 102B. The content server 150 in this example may be any computer or other server accessible to the WAP gateway 112 via the Internet, an intranet, or other communication network. The content server may therefore represent, for example, the WSS 106 or other server of the system 100.

A typical WAP transaction for retrieving information from the content server 150 in the arrangement shown in FIG. 11B may include the following steps:

1. A URI is entered into the WAP mobile client device 110.
2. The mobile client device encodes the request into an encrypted, compact binary format suitable for transmission over a wireless link, and sends it to the WAP gateway 112.
3. The gateway examines the message, converts it into a valid HTTP-based URI request, and forwards it to the content server.
4. When the content server receives the request, it fulfills it by returning the requested document or other information back to the gateway.
5. The gateway converts the HTTP response back into an encrypted, binary format and sends it to the mobile client device.
6. The mobile client device decodes the response and displays the results.

The foregoing example describes the communication of FIG. 1B without reference to the WSS 106. The particular details associated with such communication utilizing the WSS 106 will be described elsewhere herein.

FIG. 1C shows example communication utilizing a WAP push architecture, which allows information to be transmitted to a device without requiring an explicit request from the device. As shown in the figure, a WAP push operation may be accomplished by allowing the PI 116 to transmit push content and delivery instructions to the PPG 114, which then delivers the push content to the WAP mobile client 110 in the manner specified by the delivery instructions.

The term "push content" as used herein is intended to include any type of information that may be sent to a mobile client device via a push mechanism.

The PI may be implemented as an application running on a web server or other type of server. In the example of FIG. 1C, the PI communicates with the PPG using Push Access Protocol (PAP), while the PPG uses a push Over-The-Air (OTA) protocol to deliver the push content to the mobile client. The PPG may notify the PI about the final outcome of a push submission and optionally handle cancellation, replacement, client capability or other requests from the PI.

As indicated previously, additional details regarding conventional aspects of WAP are well known to those skilled in the art. Such details are therefore not described herein.

The present invention in the illustrative embodiment utilizes both push and pull mechanisms to provide secure service delivery, service notification and/or monitoring over network 102 of system 100. For example, a push mechanism may be used to send notifications or other push content to the mobile client, while a pull mechanism is used to obtain access to more detailed information upon receipt of the push content.

The PI 116 and its interaction with other system elements will now be described in greater detail.

The PI 116 is an entity that originates push content and submits it in the form of a push request to the PPG 114 for delivery to the WAP mobile client 110. The push request is preferably configured in accordance with the above-noted PAP or other suitable protocol. The PI in the illustrative embodiment is typically on the Internet, while the WAP mobile client 110 is in the WAP domain. Therefore, the PI cannot contact the WAP mobile client without an intermediary or a translation gateway, provided in this embodiment by the PPG 114. The PI addresses the PPG directly and addresses the mobile client indirectly. It assembles the push request in PAP format and submits the corresponding PAP message to the PPG. Each such submission has a unique identifier. By way of example, the PI can request the outcome of a submission, e.g., submission delivered or submission undeliverable, check the capabilities of a specific client device, or check the status of a previous submission or cancellation of a submission. The PPG provides the PI with client capability lookup services, thereby allowing the PI to select the optimal presentation attributed for particular content and a given client.

PAP utilizes extensible mark-up language (XML) and may be transported using protocols such as HTTP, simple mail transfer protocol (SMTP), etc. An example push request in the illustrative embodiment may be implemented as a single-part or multi-part document which contains one or more of the following entities:

1. A control entity comprising an XML document containing delivery instructions designed for the PPG 114. The control entity is generally viewed as a mandatory entity in the illustrative embodiment. It identifies the target mobile client device and contains delivery instructions such as time delivery restrictions.

2. A content entity that contains content destined for the mobile client device. A content entity is only required for a push submission, but when utilized should be the second entity in the multi-part document.

3. An optional capabilities entity that contains the mobile client device capabilities for which the message is formatted. The PI may create this entity to indicate what it assumes the capabilities to be. The PPG also sends a capabilities entity in response to a client capabilities query message.

The above entities may be bundled together as a Multi-Purpose Internet Mail Extensions (MIME) document, which may be sent from the PI to the PPG using a protocol such as HTTP.

PAP is also utilized to support the following example operations in the illustrative embodiment:

1. Push Submission. Delivery of a push message from the PI to a mobile device.

2. Push Cancellation. Allows the PI to attempt to cancel a push submission. All push cancellation requests may be delivered as XML documents.

3. Status Query. The PI can request the current status of a push submission. All status query requests may be delivered as XML documents.

4. Client Capabilities Query. The PI can query the PPG to retrieve the capabilities for a specific mobile client device. All such requests may be delivered as XML documents.

5. Result Notification. The PPG informs the PI of the final outcome of the push submission, for example, confirmation of content delivery to the target mobile client device. Preferably, the result notification operation is optional and occurs only if the PI requests it. All such requests may be delivered to the PI as XML documents when the final outcome of the corresponding push submission is known.

The following are examples of various types of content that may be delivered in the illustrative embodiment using PAP:

1. Service Indication (SI). This content type comprises one or more asynchronous notifications. For example, a given SI may contain a brief message and a URI specifying a particular service. The mobile client can start the associated service immediately or store the SI for later action.

2. Service Loading (SL). This content type allows a user associated with a given mobile client device to load and execute a service specified by a URI.

3. Cache Operation. This content type makes it possible to invalidate content objects in a cache associated with the mobile client device. Preferably, the system is configured such that all invalidated content objects must be reloaded from the server on which they originated the next time they are accessed. The cache operation content type may be utilized, for example, if an application cannot predict when content that it creates will expire.

A typical execution of the PI may include the following steps:

1. Address the PPG and mobile client device.
2. Assemble push content.
3. Assemble push request.
4. Submit push request.
5. Check submission status.
6. Get result notification.

It is to be appreciated that the foregoing push request entities, PAP-based operations and content types, and PI execution steps are merely illustrative examples, and need not be present in a given embodiment of the invention.

Event triggering in the system 100 may be initiated by the enterprise application 104 and relayed to mobile client 110 via the WSS 106. For example, upon receiving a given event trigger from the enterprise application, the WSS first prepares the corresponding push content and then invokes the PI to initiate a WAP push operation. When the push content reaches the mobile client device via the PPG, the user in response can request more detailed information, possibly using only a single key stroke, a process referred to herein as single-key interactive switching. Such a client-originated request for additional information initiates a WAP pull operation that pulls the multimedia content, WAP application or other information from the content generator 136 of the WSS and displays it on the mobile client device. The illustrative embodiment thus seamlessly couples WAP push and WAP pull operations. This is advantageously accomplished in a manner that not only makes the transport model transparent to users, but also facilitates a server-centric architecture by eliminating any need for a corresponding client application running on the mobile client device. The latter advantage makes the application platform device-independent and suitable for use with any type of WAP-enabled terminal.

Example user registration and secure information access processes in the system 100 will now be described in greater detail.

An example user registration process in the illustrative embodiment may include the following steps:

1. The WAP mobile client 110 can register directly through the enterprise application 104. Alternatively, the mobile client can register indirectly utilizing the registration server 132 of the WSS 106. In the latter case, the user profile may be entered manually at the mobile client, with the device profile being detected automatically utilizing a detector in the device profiling element 130 of the WSS.

2. User and device profiles obtained in step (1) are stored in the FIFO profile queue 134.

3. The enterprise application 104 periodically communicates with the register connector 122 and thereby extracts pending user registration information from the FIFO queue.

4. User registration information extracted in step (3) is deleted from the FIFO queue after retrieved, for security purposes.

An example secure information access process in the illustrative embodiment may include the following steps:

1. The WAP mobile client 110 requests information via multimodal contact channels associated with the enterprise application 104 by making a voice call, a data request or other type of request.

2. The enterprise authority authenticates the user, identifies the service request, prepares the multimedia content, packages the service content and posts it to the application connector 124 of the WSS 106 using HTTP or other suitable protocol.

3. The application connector invokes the content generator 136 to generate a text notification, a dynamic URI, and/or other content.

4. The application connector invokes the PI 116 that constructs an SI and sends it to the PPG 114 via PAP. The SI contains the text notification and URI generated in step (3), and an intrusiveness level.

5. The PPG pushes the SI to the mobile client using push OTA protocol.

6. The mobile client displays the text notification message and the available choices for URI fetching, e.g., fetch or delay.

7. The WG 112 sends a request to fetch the content to the content generator of the WSS.

8. The content generator transcodes the XML content into wireless markup language (WML), and if an image is involved activates the wireless image rendering module 138.

9. The content generator responds to the WG with WML content via HTTP.

10. The WG returns the content to the mobile client via WAP.

The foregoing example user registration and secure information access processes of the illustrative embodiment utilize the example elements of system 100 as shown in FIG. 1. As indicated previously, the invention can be implemented without using these particular elements, and those skilled in the art will recognize that other user registration and secure information access processes can be implemented using other system elements and associated protocols within the scope of the invention.

The configuration of the WSS 106 in the illustrative embodiment provides enhanced security relative to conventional techniques. For example, the WSS supports password protection through the user registration process, and personalized dynamic URI and content generation, with possible use of embedded URIs, in the secure information access process. More specifically, the content may be dynamically generated as a result of interaction between the mobile client device and the enterprise application that happens in a separate channel and at a time before the actual content is generated and delivered to the WSS.

Enhanced security may be provided in the illustrative embodiment through the use of security stamps, such as time stamps and device stamps. For example, a time stamp may be used to register the particular time of a given user request, while a device stamp may be used to register uniquely which device is allowed to retrieve the associated content. The content with these security stamps may be stored in association with a dynamically-generated URI on the WSS. In order to stop potential eavesdroppers to key entry at the mobile client device, the exact URI may be encoded in the SI of the WAP push content, which is invisible to the user and any third party. In addition, the service notification and encoded procedures for accessing the content on the WSS are delivered to a uniquely-identified mobile client device through WAP push content based on the registered device stamp.

As noted previously, certain prior approaches may permit an authenticated user direct access to information content associated with the provision of enterprise communication services. Security issues can arise in these approaches, for example, if the authenticated user is a remote user located outside an enterprise firewall and a direct pipe is established through the firewall to connect the remote user to the enterprise communication services.

The illustrative embodiment of the invention as described above provides a secure information access technique in which a user can make a service request through multimodal dialogue interaction with the enterprise application but does not have direct access to all the associated information content through the request channel. The enterprise application instead controls the content delivery through an HTTP-based interface to the WSS. Further, the content is transcoded and delivered in such a way that it is sent to a unique registered mobile client device. The location of the content and the associated procedure of pulling the content are protected by encryption, so as not to be apparent to a third party or even an intended user. Therefore, the mobile client device can be safely utilized in a crowded public area, such as in a bus or an airplane. In order to access the content, a potential attacker has to pass the authentication process through multimodal interaction with the enterprise application, and therefore must obtain both a registered mobile client device and the unique access code for that device. Moreover, even if the attacker is able to access the content in this manner, there is no direct pipe provided through the enterprise firewall, so the overall security of the enterprise communication services platform remains uncompromised.

The present invention not only provides enhanced security, but also greatly simplifies user access to content. In the illustrative embodiment, for example, a push technique is used to provide a notification to a user of a mobile client device, and that user can then initiate a pull technique to obtain associated content using only a single-key operation. This feature, also referred to herein as single-key interactive switching, represents a significant enhancement to the user experience at the mobile client device. More generally, the single-key interactive switching can be extended to a wide variety of menu options, links and other graphical user interface (GUI) controls, dramatically improving the usability of the mobile client device.

Moreover, the present invention in the illustrative embodiment allows the delivery of rich and active content to the mobile user without the restrictions on size and content commonly associated with the conventional short message service (SMS).

The invention in the illustrative embodiment provides compatibility with 2.5G, 3G and other wireless networks, thereby providing a long-term wireless solution for time-independent and location-independent notification and information access.

The server-centric architecture of the illustrative embodiment advantageously avoids the need for client applications, while also providing backward compatibility with existing SMS or WAP enabled mobile client devices.

Yet another advantage exhibited by the illustrative embodiment is that it reduces wireless airtime requirements and the associated costs, while also reducing power consumption at the mobile client device.

Figure 2:
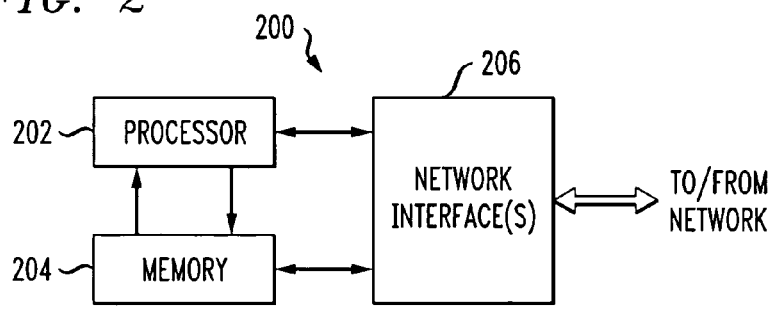
FIG. 2 is a simplified block diagram showing one possible implementation of a processing element of the FIG. 1 system.

FIG. 2 shows one possible implementation of a given processing element 200 of the FIG. 1A system. The processing element 200 may represent, by way of example, at least a portion of a client, server, gateway or other processing element of the system 100.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. For example, if viewed as representative of a mobile client device, the processing element 200 may include conventional elements typically associated with such a device, such as codecs and other voice signal processing hardware or software elements.

Another embodiment of the invention, comprising a communication system 300 providing support for communications involving a Bluetooth-enabled mobile client device, will now be described with reference to FIGS. 3 and 4.

Figure 3:
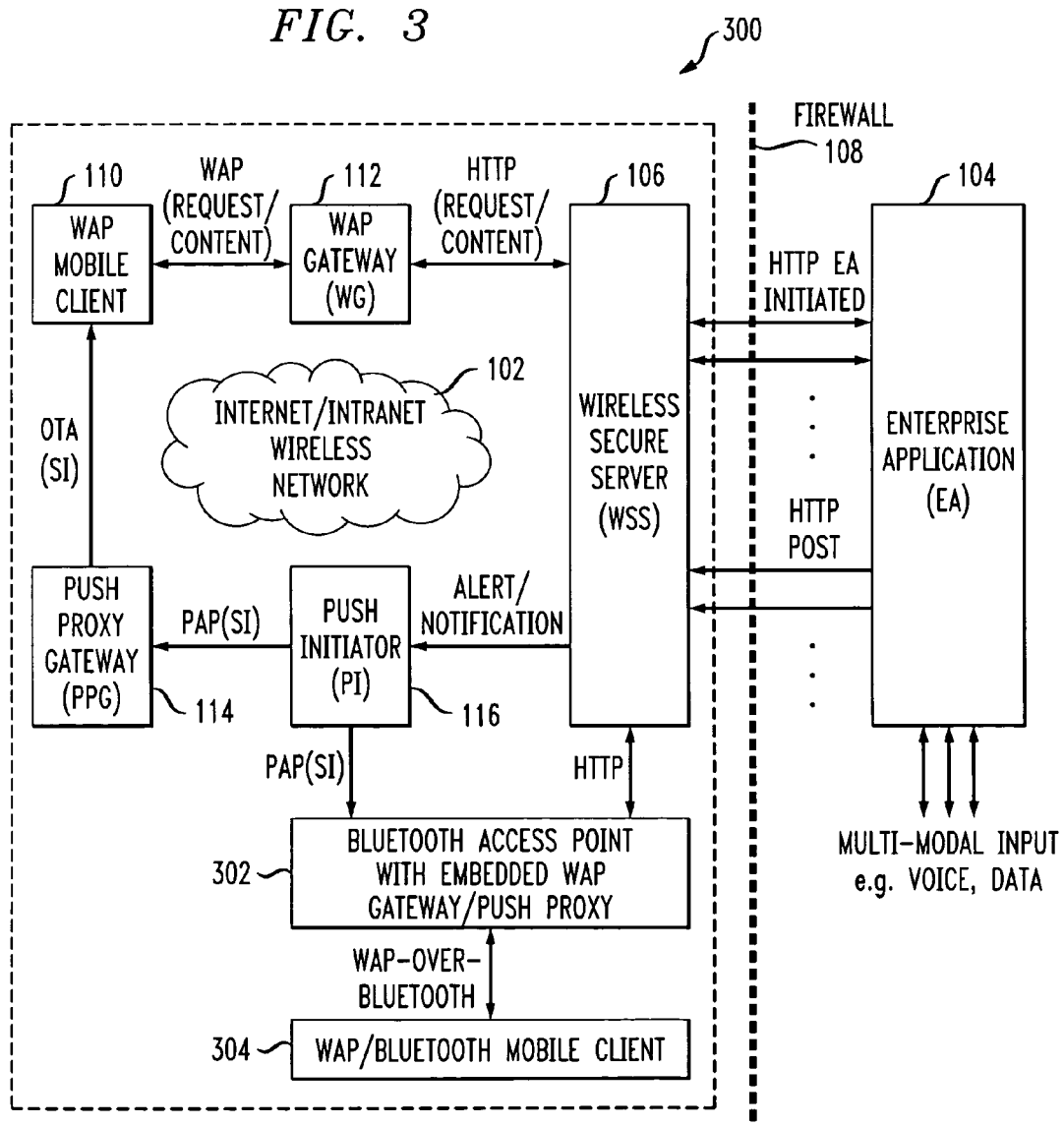
FIG. 3 shows an embodiment of the invention comprising a communication system providing support for communications involving a Bluetooth-enabled mobile client.

Referring initially to FIG. 3, the communication system 300 includes network 102, enterprise application 104, WSS 106, firewall 108, WAP mobile client device 110, WAP gateway 112, PPG 114 and PI 116, all of which are configured to provide the functionality previously described in conjunction with the illustrative embodiment of FIG. 1A.

The system 300 further includes a Bluetooth access point 302 and a WAP and Bluetooth enabled mobile client device 304. The access point 302 in this embodiment includes an embedded WAP gateway and WAP push proxy, and is coupled via a WAP-over-Bluetooth link to the WAP/Bluetooth mobile client 304. The access point 302 communicates with the PI 116 using the SI content type of PAP, and with the WSS 106 using HTTP.

The system 300 is advantageously configured to switch a given WAP service bearer transparently between network 102 and a Bluetooth link. More particularly, when the WAP/Bluetooth mobile client device 304 moves into the range of the Bluetooth access point 302, the PI 116 will address the embedded WAP push proxy and send push content to the mobile client device 304 as required. The mobile client device 304 will in turn pull detailed content from the embedded WAP gateway via the WAP-over-Bluetooth link rather than the wireless network. A benefit of this arrangement is that it can avoid the airtime cost and the delays that may be associated with the gateway of the network 102.

Active push or passive push may be used in the system 300, and other systems described herein, depending on the application context. In one example of an active push service implementable in system 300, the Bluetooth access point 302 will periodically check for available WAP/Bluetooth mobile client devices. When the access point 302 discovers, using the Bluetooth service discovery protocol, a WAP/Bluetooth mobile client device, the access point may connect to and push content to that client device. This approach may require that the mobile client device be configured to listen for inquiry and paging messages. In one example of a passive push service, the Bluetooth access point 302 may send push messages only to those WAP/Bluetooth mobile client devices that have already connected to the embedded WAP gateway.

Figure 4:
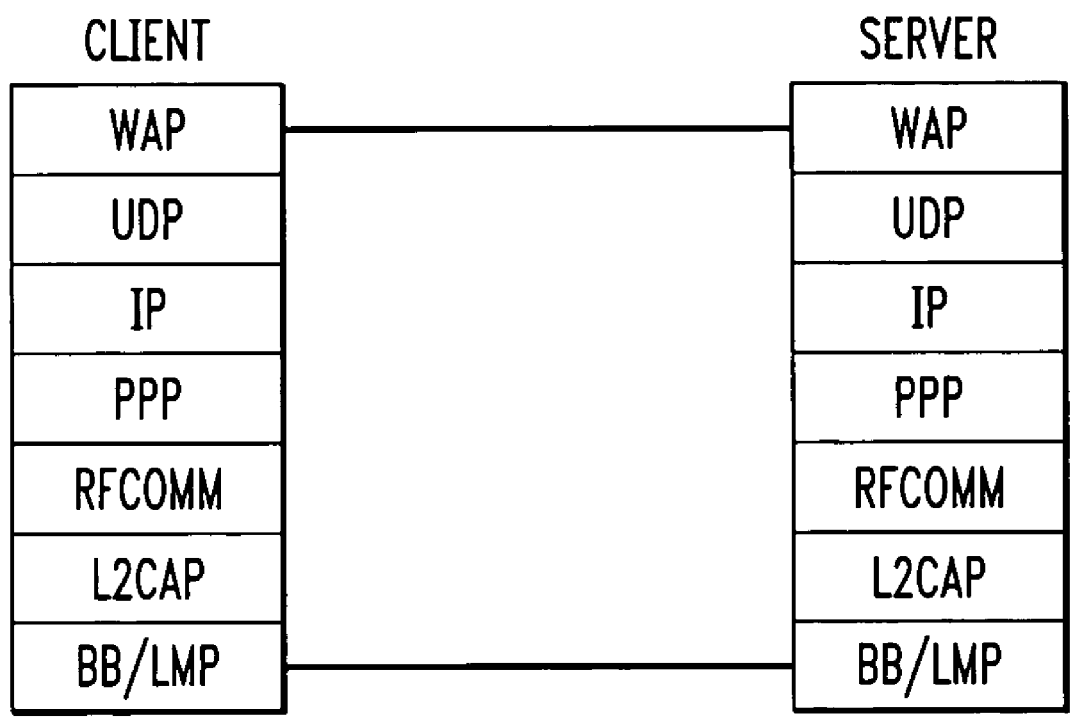
FIG. 4 is a diagram illustrating an example protocol stack characterizing communications between a client and a server in the communication system of FIG. 3.

FIG. 4 shows an example protocol stack characterizing communications between a client and a server in the communication system 300 of FIG. 3. The server in this context corresponds to the Bluetooth access point 302. The particular protocols shown in the various levels of the protocol stack are well-known conventional protocols, and are therefore not described in detail herein. The protocol stack can be adapted over Bluetooth protocols using a number of different profiles, including a LAN access profile, a serial port profile and a generic access profile, with the particular profile generally being determined in an implementation-dependent manner.

The protocol stack as shown in FIG. 4 corresponds generally to the LAN access profile, in which point-to-point protocol (PPP) is used over RFCOMM protocol, and use of this protocol stack is assumed for the embodiment of FIG. 3.

The WAP environment utilizes two basic types of addressing, namely, user addressing and proxy/gateway addressing. User addressing is independent of the underlying bearer, while proxy/gateway addressing is dependent on the bearer type.

An example of a typical WAP push and pull communication over Bluetooth in the system 300 may include the following steps:

1. Access point discovers the WAP/Bluetooth mobile client device in range.
2. Access point discovers the WAP capability of the client device.
3. Access point establishes a Bluetooth connection to the client device.
4. Access point submits WAP push content over Bluetooth link.
5. Client device receives the push content.
6. Client device requests additional information at pushed URI.
7. Client initiates WAP pull operation over the Bluetooth link.

These particular processing steps are presented by way of example, and other steps may be used in other embodiments. Also, use of Bluetooth in the FIG. 3 embodiment is by way of illustrative example only, and other wireless networking protocols may be used in place of Bluetooth, such as IEEE 802.11 wireless local area networking protocols.

As previously noted, one or more of the processing functions described above in conjunction with the illustrative embodiments of the invention may be implemented in whole or in part in software utilizing processor 202 and memory 204 associated with a processing element of the system. Other suitable arrangements of hardware, firmware or software may be used to implement the techniques of the invention.

It should again be emphasized the above-described arrangements are illustrative only. For example, alternative embodiments may utilize different processing element hardware, firmware or software configurations, different registration and secure information access processes, and different communication protocols than those of the illustrative embodiments. These and numerous other alternative embodiments within the scope of the following claims will be apparent to those skilled in the art.

What is claimed is:

1. A method comprising:
    generating push content in a server, responsive to information received in the server from an enterprise application, wherein:
        (i) the push content is delivered from the server to a client device over a wireless network,
        (ii) the push content comprises an embedded uniform resource identifier (URI) that identifies information, and
        (iii) the uniform resource identifier (URI) is embedded in the push content such that the uniform resource identifier (URI) is invisible to users of the client device; and
    receiving in the server from the client device, responsive to the push content that comprises the uniform resource identifier (URI), a request for the information that is identified by the uniform resource identifier (URI);
    wherein the request initiates a pull operation that pulls the information that is identified by the uniform resource identifier (URI) and displays the information that is identified by the uniform resource identifier (URI) on the client device.

2. The method of claim 1 wherein the server comprises a wireless secure server.

3. The method of claim 2 wherein the enterprise application is separated from the wireless secure server via an enterprise firewall, the enterprise application being inside the enterprise firewall and the wireless secure server being outside the enterprise firewall.

4. The method of claim 2 wherein the enterprise application and the wireless secure server are implemented as elements of a common processing platform.

5. The method of claim 4 wherein the common processing platform comprises an enterprise communication server.

6. The method of claim 2 wherein the client device registers with the enterprise application through interaction with the wireless secure server.

7. The method of claim 2 wherein the wireless secure server comprises a password-protected register connector through which registration information associated with the client device is supplied from the wireless secure server to the enterprise application.

8. The method of claim 2 wherein the wireless secure server is operative to obtain user and device profile information from the client device, and to store the profile information temporarily until the profile information is extracted from the wireless secure server by the enterprise application.

9. The method of claim 2 wherein the wireless secure server communicates with the client device utilizing wireless application protocol (WAP).

10. The method of claim 2 wherein the push content is delivered from the wireless secure server to the client device via a series connection of a push initiator and a push proxy gateway.

11. The method of claim 2 wherein the request for the information that is identified by the uniform resource identifier (URI) is delivered from the client device to the wireless secure server via a WAP gateway.

12. The method of claim 2 wherein the information that is identified by the uniform resource identifier (URI) is delivered from the wireless secure server to the client device via a WAP gateway.

13. The method of claim 2 wherein the wireless secure server comprises an application connector coupled to the enterprise application and utilized in generating at least one of the push content and the information that is identified by the uniform resource identifier (URI).

14. The method of claim 2 wherein the push content is generated by the wireless secure server responsive to an event trigger generated by the enterprise application subsequent to receipt in the enterprise application of an interaction request from the client device and authentication of a corresponding user by the enterprise application.

15. The method of claim 2 wherein the client device is configured to support a wireless networking protocol and the wireless secure server is operative to communicate with the client device via an access point compliant with the wireless networking protocol.

16. The method of claim 1 comprising transmitting, in response to a request by an enterprise application, registration information to the enterprise application, wherein:
    (i) the enterprise application is separated by a firewall from the server, and
    (ii) the enterprise application requests authentication information of client devices from the server.

17. The method of claim 1 wherein the request for information that is identified by the uniform resource identifier (URI) is initiated in the client device utilizing a single-key operation.

18. The method of claim 1 wherein the push content is generated in the form of a service indication (SI) including at least one notification message and at least one corresponding URI.

19. An apparatus comprising:
    a processor coupled to a memory;
    the apparatus being operative to receive push content that is generated by a server, wherein:
        (i) the push content is delivered from the server to the apparatus over a wireless network,
        (ii) the push content comprises an embedded uniform resource identifier (URI) that identifies information, and
        (iii) the uniform resource identifier (URI) is embedded in the push content such that the uniform resource identifier (URI) is invisible to users of the apparatus; and
    the apparatus being further operative to generate, responsive to the push content that comprises the uniform resource identifier (URI), a request for information that is identified by the uniform resource identifier (URI), wherein the request initiates a pull operation that pulls the information that is identified by the uniform resource identifier (URI) and displays the information that is identified by the uniform resource identifier (URI) on the apparatus.

20. The apparatus of claim 19 wherein the request for information that is identified by the uniform resource identifier (URI) is initiated by a single-key operation.

* * * * *